United States Patent [19]

Woeber

[11] 4,359,240

[45] Nov. 16, 1982

[54] DEVICE FOR SMALL CYLINDRICAL AND FOR PENETRATABLE OBJECTS

[76] Inventor: Clarence E. Woeber, Rte. 1, Box 130, Plainview, Ill. 62676

[21] Appl. No.: 192,612

[22] Filed: Sep. 30, 1980

Related U.S. Application Data

[63] Continuation-in-part of Ser. No. 53,191, Jun. 29, 1979, abandoned.

[51] Int. Cl.³ .............................................. B25J 1/00
[52] U.S. Cl. .................................. 294/24; 294/19 R; 294/61
[58] Field of Search .................. 294/2, 10, 14, 19-24, 294/28, 33, 50.8, 50.9, 51, 59, 61, 99 R, 99 S, 104, 106, 110 A; 56/328 R

[56] References Cited

U.S. PATENT DOCUMENTS

| | | | |
|---|---|---|---|
| 875,159 | 12/1907 | Crow | 294/59 |
| 1,464,353 | 8/1923 | Crinella | 294/51 |
| 1,482,147 | 1/1924 | Potts | 294/20 |
| 1,715,039 | 5/1929 | Locke et al. | 294/99 R |
| 2,021,529 | 11/1935 | Tate | 294/20 |
| 2,196,117 | 4/1940 | Lange | 294/99 R |
| 2,249,119 | 7/1941 | Di Palma | 294/19 R X |
| 2,392,865 | 1/1946 | Smith | 294/20 |
| 2,634,999 | 4/1953 | Fjeld | 294/20 |
| 2,655,403 | 10/1953 | Ernest | 294/99 S |
| 3,242,513 | 3/1966 | Janke | 294/2 X |

Primary Examiner—Johnny D. Cherry
Attorney, Agent, or Firm—Ralph F. Staubly

[57] ABSTRACT

Paired adjustably closable arcuate jaws are relatively swingably mounted on an end of a stiff shaft of waist-height length (e.g. thirty to forty inches). The jaws are of a size, and are spring-biased, for gripping and lifting cans, bottles, ears of corn and other small cylindrical objects. The tips of the jaws can be rounded, but preferably are provided with large low-friction rollers, so as to be cammed open when pressed against the object being grasped. The shaft desirably has a cylindrical handle grip on its upper end. The grip may be partly or fully removable or displaceable to expose a pointed shaft end for picking-up penetratable objects. Also the shaft end can be threaded for detachable reception in an axial socket in the end of an extension rod. Further, the shaft may carry, at its opposite ends, pickup devices differently sized and/or adjusted for grasping objects of different sizes and/or weights. The upper end of the shaft can be sharply pointed to be used as a pickup device for spearing easily penetratable objects. The pointed end is desirably covered by a removable or displaceable hand-grip part, and has an exposed shaft portion threaded for connection thereto of an extension rod of one or more sections.

6 Claims, 8 Drawing Figures

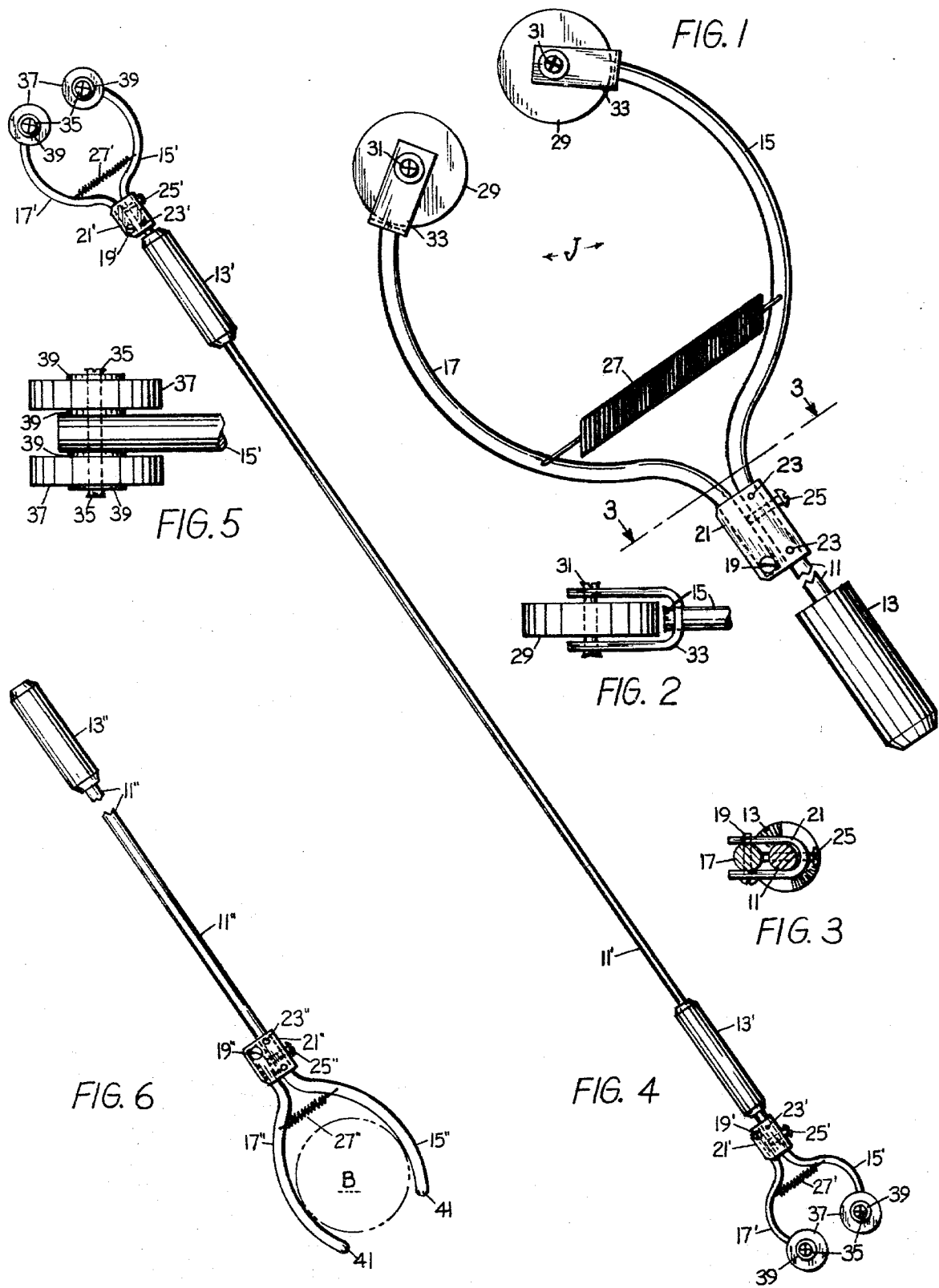

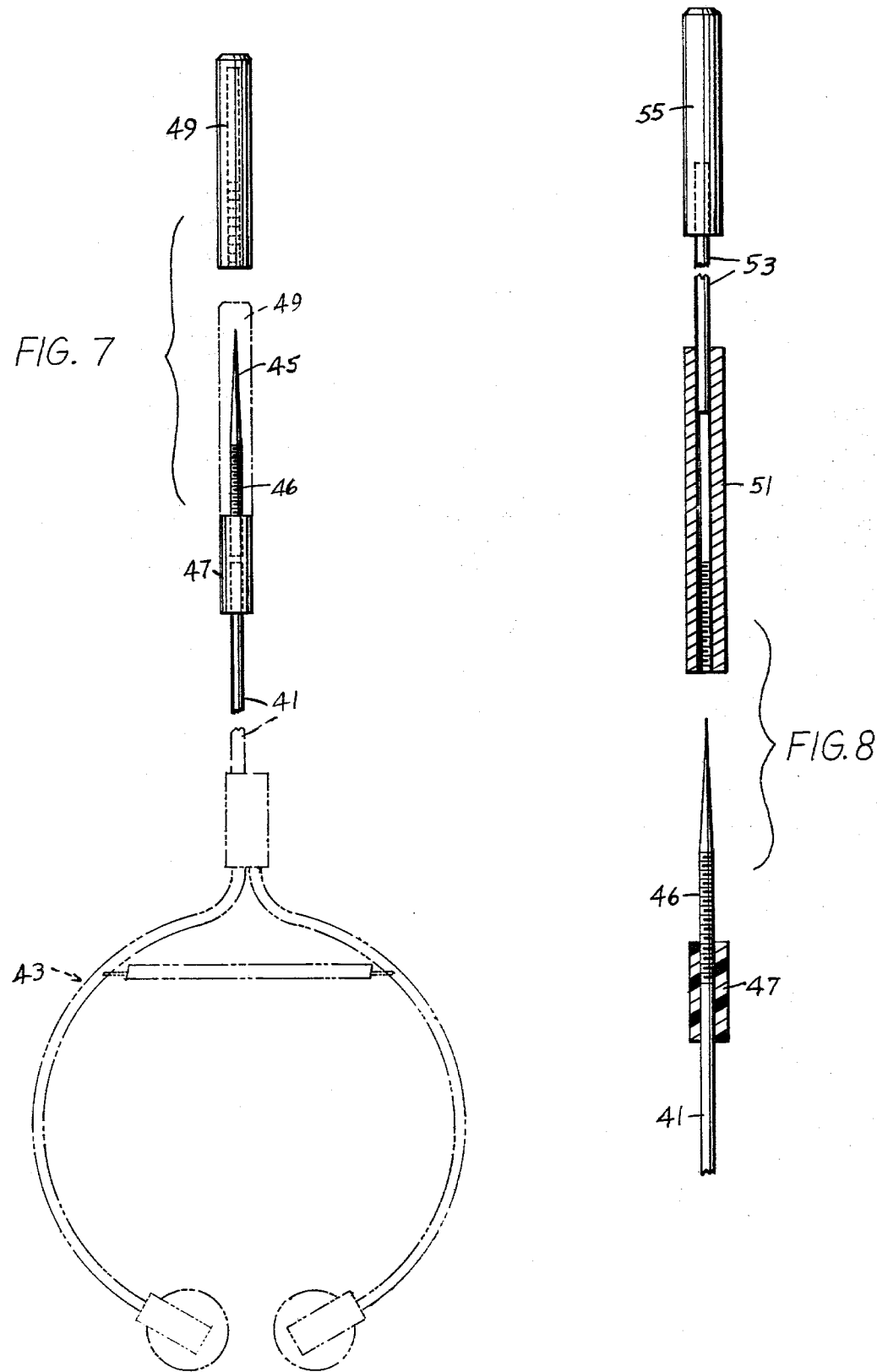

DEVICE FOR SMALL CYLINDRICAL AND FOR PENETRATABLE OBJECTS

This application is a continuation-in-part of application Ser. No. 53,191, filed June 29, 1979, now abandoned.

BACKGROUND AND OBJECTS OF THE INVENTION

Pickup devices having spring-biased jaws cammingly engageable over cylindrical objects are known, e.g. U.S. Pat. No. 1,715,039 to Locke et al. It is also old to pickup penetratable objects by spearing them with a pointed rod. But it is not shown to construct such a pickup device having large low-friction rollers on its jaw ends, and optionally having (A) a different-sized pickup head at the other end of a supporting shaft, or (B) an object-penetrating sharply-pointed other end on the shaft and an extension rod for adapting the device for use from a boat or a truck. It is the principal object of this invention to provide such a device. Other objects and advantages will appear as the following detailed description proceeds.

BRIEF DESCRIPTIONS OF THE DRAWING FIGURES

FIG. 1 is a side elevational view of a preferred embodiment of the invention.

FIG. 2 is a fragmentary plan view of the right jaw of FIG. 1.

FIG. 3 is a plan view in section taken on the line 3—3 of FIG. 1.

FIG. 4 is a side elevational view of a double-ended species of the invention.

FIG. 5 is an enlarged fragmentary plan view of the upper right jaw of FIG. 4.

FIG. 6 is an elevational view of a third species of the disclosure.

FIG. 7 is an exploded elevational view of a fourth species.

FIG. 8 is an exploded view of the medial portion of FIG. 8 in partial axial section and with extension-rod details added.

DETAILED DESCRIPTION

With reference now to FIGS. 1-3, the reference numeral 11 designates a shaft usually of approximately adult-waist-height length (35 plus-or-minus 5 inches), and for easier and more comfortable handling a conventional handle 13 is attached adjacent one end of the shaft 11. The other end of the shaft 11 is arcuately bent to form one jaw-element 15 of the object-grasping jaws J.

A second arcuate jaw-element 17 is swingably attached to the shaft 11 by a pivot pin 19 carried by a yoke element 21 which is pinned or spot-welded at 23 to the shaft 11. A screw 25 provides adjustment of the gap between the jaw ends. A coil spring 27, the tension of which could be made adjustable by conventional means, e.g. a threaded-shank hook and a nut (not shown), biases the jaws to close.

The free ends of the jaw elements carry very large low-friction rollers 29 mounted on axle pins 31 which bridge the gap of U-shaped forks 33. The bight portions of the forks 33 are welded or otherwise fixed to the free ends of the jaw elements 15 and 17.

FIG. 4 discloses a double-ended pickup device in which primed numerals designate parts corresponding to like parts bearing unprimed numerals in FIGS. 1-3. The upper-left pickup device is larger (e.g. of quart-container size) than the lower-right one (e.g. of pint-container size), and the handles 13' necessarily cannot be located as close to the ends of the shaft as in the single-grasper species of FIG. 1, or of FIG. 6 described hereinafter.

In the FIGS. 4 and 5 disclosure, the free end of each jaw-element 15' and 17' is transversely bored to receive pintles 35 on each end of which is rotatably carried a wheel 37. Four friction-reducing washers 39 (FIG. 5) space the wheels 37 from the jaw elements 15' and 17' and from the head end and the peened end of the pintles 35.

In FIG. 6, double-primed numerals designate parts corresponding to like parts bearing unprimed numerals in FIGS. 1-3. The FIG. 6 species differs from those of FIGS. 1-5 only in employing smoothly rounded free ends 41 on the jaw elements 15" and 17" instead of rollers or wheels. While this embodiment of the invention works well for grasping smooth glass bottles B, it will not work as well as the other species for grasping cans or ears of corn.

In FIGS. 7 and 8, the shaft 41 carries on its lower end a phantom-shown jaw-type pickup device generally designated 43 and constructed like that of FIGS. 1-3. But the upper end of the shaft 41 has a sharply pointed end 45 for pickup spearing of leaves, paper articles, etc. Behind the pointed end 45 the shaft is threaded at 46 to provide better anchorage in a bore in the handle-grip lower portion 47, and for screw-on attachment of the upper hand-grip portion 49 (FIG. 7), which covers the pointed shaft end 45 to protect both it and also the user of the device. The threads 46 have two additional utilities: (1) they provide better temporary retention of speared articles, and (2) they provide screw-on attachment for a threaded-bore sleeve 51 fixed to the lower end of an extension rod 53. The rod 53 can be made of any desired length (and of plural sections in known manner) to adapt the device for grasping more remote objects from a truck or boat. A handle 55 fixed to the rod's upper end is like the handles 13, which can be wood, plastic or metal.

The invention having been described, what is claimed is:

1. A pickup device for grasping and handling cylindrical objects, comprising: a support shaft of average adult-waist-height length; a pair of pivotally connected arcuate jaw elements fixed to the lower end of said shaft so as to be relatively swingable away from and then toward each other to grasp one of said objects; means for adjusting the initial gap width; tension coil-spring means for gently biasing said jaw elements toward grasping positions; the ends of said jar elements being large-diameter-rollers constructed and arranged to provide such low-friction engagement with the surface of a cylindrical object that when gently pressed against said object said jaw elements will be cammed apart for automatic slip-over grasping of said object, each of said large-diameter rollers having a diameter at least 30% of the transverse diameter of the closed-jaw area, and being mounted on an axle parallel to the swing axis of said jaws.

2. A pickup device according to claim 1 and additionally comprising a different-sized but otherwise-duplicating object-grasping mechanism on the lower end of said shaft.

3. A pickup device according to claim 2 and additionally comprising a handle grip on and adjacent each shaft end.

4. A pickup device according to claim 1 wherein the upper end of said shaft has a sharply-pointed end for pickup spearing of easily penetratable objects, and has a point-covering handgrip of which at least a portion is displaceable to uncover said sharply-pointed end.

5. A pickup device according to claim 4 wherein said shaft is threaded behind said sharply-pointed end for improved temporary retention of speared objects, and for hand-grip retention 6. A pickup device according to claim 5 and additionally comprising an extension rod having a threaded-bore sleeve for screw-on axial attachment to the threaded upper end of said shaft.

* * * * *